(12) United States Patent
Fischer

(10) Patent No.: US 8,591,358 B2
(45) Date of Patent: Nov. 26, 2013

(54) BELT TENSIONER

(75) Inventor: Michael Fischer, Fellen (DE)

(73) Assignee: Litens Automotive GmbH, Geinhausen (DE)

( * ) Notice: Subject to any disclaimer, the term of this patent is extended or adjusted under 35 U.S.C. 154(b) by 479 days.

(21) Appl. No.: 12/091,946

(22) PCT Filed: Sep. 20, 2006

(86) PCT No.: PCT/EP2006/009161
§ 371 (c)(1),
(2), (4) Date: Apr. 29, 2008

(87) PCT Pub. No.: WO2007/051507
PCT Pub. Date: May 10, 2007

(65) Prior Publication Data
US 2008/0280713 A1 Nov. 13, 2008

(30) Foreign Application Priority Data

Oct. 31, 2005 (DE) .................... 20 2005 016 992 U

(51) Int. Cl.
*F16H 7/12* (2006.01)
(52) U.S. Cl.
USPC ........................................................ 474/135
(58) Field of Classification Search
USPC ........... 474/134, 135, 133, 138; 384/223, 275
See application file for complete search history.

(56) References Cited

U.S. PATENT DOCUMENTS

| | | | | |
|---|---|---|---|---|
| 4,557,707 A | * | 12/1985 | Thomey ........................ | 474/101 |
| 4,698,049 A | * | 10/1987 | Bytzek et al. ................. | 474/135 |
| 4,872,768 A | * | 10/1989 | Brandenstein et al. ....... | 384/223 |
| 6,102,820 A | * | 8/2000 | Imaharu et al. ............... | 474/135 |
| 7,275,462 B2 | * | 10/2007 | Faus et al. .................... | 81/57.38 |
| 7,367,714 B2 | * | 5/2008 | Niarfeix et al. ............... | 384/448 |
| 2001/0021679 A1 | * | 9/2001 | Ohira et al. ................... | 474/135 |
| 2006/0217222 A1 | * | 9/2006 | Lolli et al. .................... | 474/134 |

FOREIGN PATENT DOCUMENTS

| | | |
|---|---|---|
| DE | 37 42 030 A1 | 6/1989 |
| DE | 3801533 A1 | 7/1989 |
| DE | 4400830 A1 | 12/1994 |

(Continued)

OTHER PUBLICATIONS

JP 2008-538269 Office Action dated Aug. 21, 2012—English translation.

(Continued)

*Primary Examiner* — William E Dondero
*Assistant Examiner* — Robert T Reese
(74) *Attorney, Agent, or Firm* — Millman IP Inc.

(57) ABSTRACT

The aim of the invention is to improve a belt tensioner for a belt drive of an internal combustion engine, having a central bearing device which serves to define a pivot axis for the belt tensioning arm, and having a bearing sleeve which is connected to the tensioning arm, wherein the bearing device extends through the bearing sleeve and the bearing sleeve is mounted in a friction-damping manner by means of a plain bearing arrangement, so as to be pivotable about the bearing device, with said improvement being such that a good function of the belt tensioner is maintained despite a simplification of the design and a reduction in differently designed parts. Said problem is solved by means of a generic belt tensioner for a belt drive of an internal combustion engine, in which the plain bearing arrangement has at least two opposite sliding faces which have the same material.

18 Claims, 1 Drawing Sheet

(56) References Cited

FOREIGN PATENT DOCUMENTS

| | | | |
|---|---|---|---|
| DE | 195 24 403 A1 | 3/1997 | |
| DE | 19524403 C2 | 9/2000 | |
| DE | 100 53 186 A1 | 5/2002 | |
| DE | 10053186 A1 | 5/2002 | |
| JP | 666321 | 3/1994 | |
| JP | 7293720 | 11/1995 | |
| JP | 2003-42244 A | 2/2003 | |
| JP | 2005-161881 A | 6/2005 | |
| WO | 2004059192 A1 | 7/2004 | |
| WO | WO2004059192 A1 * | 7/2004 | ............... F16H 7/12 |

OTHER PUBLICATIONS

KR 10-2008-7013031 Office Action dated Nov. 29, 2012—English translation.

JP 2008-538269 Office Action dated Apr. 16, 2013—English translation.

* cited by examiner

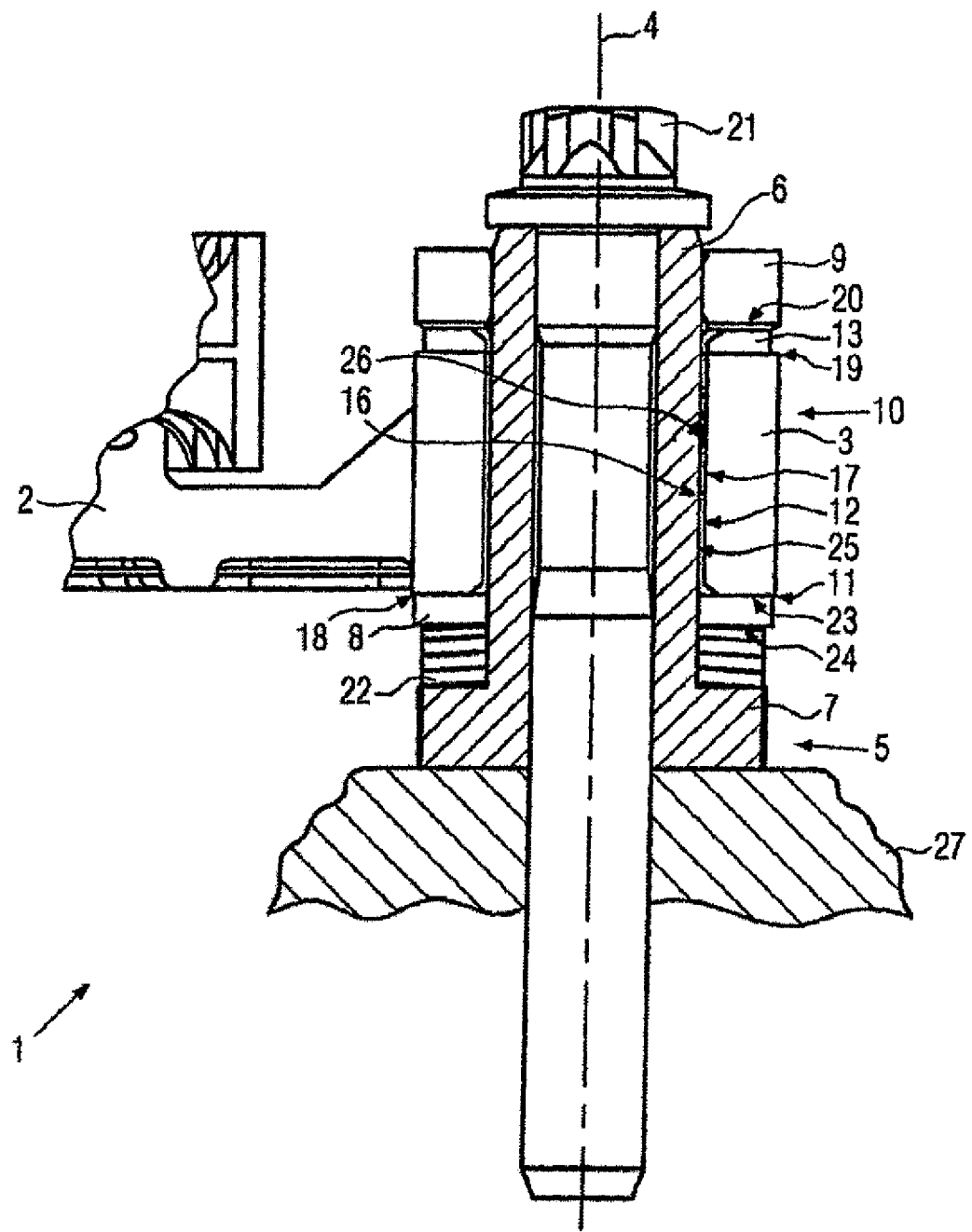

BELT TENSIONER

The invention relates to a belt tensioner for a belt drive of an internal combustion engine having the characteristics of the preamble of claim 1.

In a belt tensioner of this type known from DE 195 24 403, a tensioning arm for tensioning a belt drive is fixed to a bearing bushing, which is pivotably mounted about a central, cylindrical bearing part. Between the bearing sleeve and the bearing part, a friction-reducing sleeve is provided. The sleeve is made of a bronze foil incorporating PTFE. The bronze foil rests against the inside of the bearing sleeve and is fixed in place there in a frictionally engaged manner. The incorporated PTFE layer points toward the bearing part and forms a sliding surface combination therewith.

The bearing sleeve is axially supported via a friction-reducing disk on a disk of the belt tensioner. The friction-reducing layer is made of the same material as the friction-reducing sleeve and is rotatably fixed via the frictional engagement of the bronze layer on the axial end surface of the bearing sleeve.

The central bearing part is fastened to an engine component by means of a fastening device, which extends through the central bearing part. At the same time, the bearing sleeve is axially fixed on the central bearing part and is prestressed in relation to disk springs, which are provided between the engine component and the bearing sleeve. Between the fastening device and the face of the bearing sleeve, a damping disk made of polyamide 4.6 or polyamide 6.6 is provided, which dampens a motion of the tensioning arm by friction. The damping disk is shaped asymmetrically and is received in a correspondingly shaped recess on the axial face of the bearing bushing, thereby being secured against twisting.

The above-described belt tensioner comprises a plurality of different, in part asymmetrically shaped sliding or friction elements. The many different components are not only a higher cost factor in procurement, they also increase the complexity of the belt tensioner and therefore the expenses relating to design and assembly. From a design perspective, a wide variety of different friction or sliding element combinations must be provided. The assembly of the individual components is prone to errors because every component must be installed with alignment.

It is therefore the object of the invention to improve a belt tensioner of the type mentioned above such that good function of the belt tensioner is maintained, despite simplification of the design and a reduction in the number of differently configured individual parts.

This object is achieved according to the invention by a belt tensioner having the characteristics of claim 1.

According to the state of the art, sliding elements typically have two different faces. Plain bearing bushings, for example, frequently have a bronze surface, which serves the frictionally engaged fixation of the bearing bushing on a first component. In addition, they comprise a sliding layer, which is disposed opposite the bronze layer and enables a sliding support of a second component in relation to the first component. The sliding element arrangement according to the invention, however, provides two identical sliding faces, by which likewise good plain bearing properties can be achieved.

In principle, there are two possibilities for supporting a first component on a second component using conventional plain bearing bushings. First, by means of a plain bearing bushing, which is fixed in the first component in a frictionally engaged manner, and secondly, by means a plain bearing bushing, which is fixed in the second component in a frictionally engaged manner. Each of these options is implemented using a separate plain bearing bushing. The plain bearing arrangement according to the invention, however, implements both functions in one component. Since it offers two identical sliding faces, it can be used to achieve both of the above-mentioned options—simply by adjusting the surface roughness properties of the sliding or friction elements.

Symmetrical components, such as sliding disks, had to be installed with alignment according to the state of the art due to the different surfaces. Since the sliding element arrangement according to the invention comprises two identical, opposing sliding faces, it is now also possible to install them inversely. This reduces the proneness to errors in assembly.

Furthermore, a sliding element arrangement having identical sliding faces can be produced more inexpensively and quickly, for example, by means of injection molding. This is contrary to plain bearings used according to the prior art, which are made, for example, of a bronze base structure and subsequently deposited PTFE.

According to the present state of the art, different interfaces and material pairings had to be configured. This expense is reduced with the two identical sliding faces according to the invention.

In one embodiment of the invention, the sliding faces may comprise polyamide 4.6. This material allows the requirements with respect to the sliding support and also with respect to friction damping of the tensioning arm to be implemented well.

In a further embodiment of the invention, the sliding element arrangement, particularly the sliding faces thereof, can be made of polyamide 4.6 with PTFE being admixed. This material guarantees good wear resistance and a long service life.

According to an advantageous embodiment of the invention, the sliding element arrangement may comprise at least one injection-molded part. A sliding element having identical sliding faces can be produced easily, fast, and cost-efficiently using an injection molding method.

According to a further embodiment of the invention, the bearing device can be made of the same material as the bearing sleeve. This further simplifies the design and therefore the configuration, because in this case always the same material pairings are used.

According to an advantageous example of the invention, the sliding element arrangement may comprise a sliding disk, which is disposed between a supporting disk of the bearing device and a lower axial face of the bearing sleeve, wherein the sliding disk can be rotated both in relation to the supporting disk and in relation to the bearing sleeve. For the installation of the sliding disk it is not relevant which of the two sliding faces rests on the supporting disk or the bearing bushing. This design reduces the proneness to errors in assembly. The tribological pairing further reduces the forces transmitted from the bearing sleeve to the supporting disk.

In an advantageous embodiment of the invention, the supporting disk may comprise a surface and an undersurface having the same surface properties. This further reduces the proneness to errors in assembly.

Advantageously, the supporting disk may comprise a burnished surface and undersurface. This reduces the friction between the supporting disk and the sliding disk and thereby contributes to the unimpaired sliding of the bearing sleeve in relation to the supporting disk. The rotational movements of the bearing sleeve are thereby hardly transmitted to the supporting disk as a result of the extremely low friction. Due to the lower friction coefficient of the surface thereof, the burnished undersurface of the supporting disk, which serves as a contact surface for further components, also provides very poor transmission of any possibly occurring movements.

According to an advantageous embodiment of the invention, the supporting disk may comprise a surface and undersurface having a lower surface roughness of Rz<8 μm. This enables an efficient reduction in the force transmission from the bearing sleeve to the supporting disk and to further components resting thereon.

In one embodiment of the invention, the sliding element arrangement may comprise a bearing bushing, which is disposed between a bolt of the bearing device and the bearing sleeve, wherein the bearing bushing can be rotated both in relation to the bearing sleeve and in relation to the bolt. Due to the two identical sliding bearing surfaces, it is no longer important from a design perspective to be limited to one sliding element combination. As a result, design changes are possible quickly and without complications, and can typically be implemented using the same, existing bearing bushing. This allows old inventory to be used even following a design change.

Advantageously, an outer circumferential area of the bolt may have a lower surface roughness of Rz<8 μm. This enables good sliding support of the bearing sleeve and thereby good pivotability of the tensioning arm.

According to a further embodiment of the invention, an inside of the bearing sleeve may have a lower surface roughness of Rz<8 μm. This likewise guarantees good sliding support of the bearing sleeve and thereby provides a further, identical sliding element combination.

In an advantageous embodiment of the invention, the sliding element arrangement may comprise a damping disk, which is disposed between a front disk of the bearing device and an upper axial face of the bearing sleeve, wherein the damping disk is rotation-symmetrical in relation to the center thereof. As a result of this general disk shape, the damping disk can be easily combined with other disks, such as a sliding disk. The number of different individual components can thus be further reduced.

According to one embodiment of the invention, the upper axial face of the bearing sleeve may have a greater surface roughness than the surface of the front disk facing the bearing sleeve. Due to the elevated surface roughness, the damping disk is fixed at the face of the bearing sleeve. Damping can thus be adjusted by means of the surface roughness of the front disk.

Advantageously, the surface of the front disk facing the bearing sleeve can have a surface roughness in the range of approximately Rz=10 to 25 μm. This guarantees good damping of the tensioning arm.

According to one embodiment of the invention, the upper axial face of the bearing sleeve can have a high surface roughness Rz in the range of approximately 10 to 25 μm, at least in some regions. This enables sufficiently stable fixation of the sliding disk upon rotation of the bearing sleeve in relation to the front disk.

According to an advantageous embodiment of the invention, the upper axial face of the bearing sleeve may be sandblasted, at least in some regions. In this way, it is easy to produce the desired surface roughness.

Advantageously, the material of the bearing device may have approximately the same thermal expansion coefficient as the material of the bearing sleeve. Materials that have the same thermal expansion coefficient guarantee good dimensional stability and good adherence to the tolerances across the entire temperature range. This also means substantially equally good action of the belt tensioner during temperature fluctuations.

One example of the invention will be described hereinafter on the basis of the following FIGURE, wherein:

FIG. 1 shows a section of the bearing of a tensioning arm of a belt tensioner according to the invention.

FIG. 1 shows a section of the bearing of a tensioning arm 2 of a belt tensioner 1 according to the invention. The invention will be explained by way of example of a belt tensioner comprising one tensioning arm. The invention of course also relates to belt tensioners that have a plurality of tensioning arms.

The belt tensioner 1 comprises a tensioning arm 2, which in the example is configured as one piece with a bearing sleeve 3. Alternatively, the bearing sleeve 3 and the tensioning arm 2 can also be configured as two individual parts that are fixed to one another. In this example, the bearing sleeve 3 and therefore also the tensioning arm 2 are made of aluminum or an aluminum alloy, for example by means of cold extrusion or die casting. However, other materials, such as different types of steels, and other manufacturing methods, such as casting, forging or milling, are also conceivable for these two components.

The tensioning arm 2 and the bearing sleeve 3 are rotatably disposed about a pivot axis 4 on a central bearing device 5. In this example, the central bearing device 5 is made of a plurality of individual parts. It comprises a bolt 6, which has a one-piece integrally formed flange 7 at the lower axial end, a supporting disk 8, and a front disk 9. Alternatively, the bearing device 5, however, can also be made of additional, further elements. For example, the flange 7 may be configured as a separate disk, which is axially connected in a torsion-proof manner to the bolt 6. Vice versa, also a reduction in the number of components is possible in that the individual components of the bearing device are configured as one piece with each other, or with other components of the belt tensioner. In this example, the bearing device 5 is made of the same material as the bearing bushing. It is produced from aluminum or an aluminum alloy by means of cold extrusion. Alternatively, it is conceivable to use the same materials and production methods for the bearing device 5 as for the bearing sleeve. While the bearing device 5 and the bearing sleeve 3 in this advantageous embodiment have the same material, other embodiments of the invention can provide for the use of different materials.

The bearing sleeve 3 is seated in the bearing device 5 by means of a sliding element arrangement 10. In this example, the sliding element arrangement 10 likewise comprises a plurality of individual components, which is to say a sliding disk 11, a bearing bushing 12, and a damping disk 13. The sliding element arrangement 10 is made of polyamide 4.6 with PTFE being admixed.

In this example, the sliding element arrangement 10 is an injection-molded part and has a completely homogeneous structure. This means that the distribution of the PTFE in the base polyamide material is uniform. However, this is not absolutely essential. In other embodiments of the invention, the PTFE can also be incorporated or introduced in the polyamide only in some regions. Alternatively, the sliding element arrangement 10 can also be produced using other production methods, such as casting or laminating. Due to the special configuration of the sliding element arrangement 10, two identical sliding faces are obtained for each individual part 11, 12, 13 of the sliding element arrangement. This means that both the sliding disk 11 and the damping disk 13 on the front surfaces thereof have the same sliding properties as on the rear surfaces thereof. Also the bearing bushing 12 has identical surface properties on the inner circumferential area 16 thereof and on the outer surface 17 thereof.

Between the flange 7 and the supporting disk 8 of the bearing device 5, a spring element is provided, for example one or more disk springs 22. The supporting disk 8 serves the uniform transmission of the spring force onto the lower axial face 18 of the bearing sleeve 3. It is made of aluminum, as is the entire bearing device 5. Alternatively, however, other materials and production methods are also possible for the supporting disk. For example, the supporting disk could be made of any arbitrary steel, such as by means of forging, milling or turning. The upper surface 23 and the lower surface 24 of the supporting disk 8 have a low surface roughness, and therefore a low friction coefficient, and are produced, for example, by means of roller-burnishing, burnishing, or other common treatment methods. Between the supporting disk 8 and the lower axial face 18 of the bearing bushing 3, the sliding disk 11 of the sliding element arrangement 10 is provided.

The damping disk 13 of the sliding element arrangement 10 is provided between an upper axial face 19 of the bearing sleeve 3 and the front disk 9 of the bearing device 5. The surface of the upper axial face 19 of the bearing sleeve 3 has a high surface roughness, at least in some regions, of at least Rz: 10 μm. This roughness can be produced, for example, by means of sandblasting or other common surface treatment methods. The surface roughness of the surface 20 of the front disk 9, which faces the bearing sleeve 3, is in the range of approximately 10 to 25 μm. In this example, it is lower than the surface roughness of the face 19. In other embodiments of the invention, however, it can be just the opposite. In special applications, it is also conceivable that the surface roughness of the face 19 and the surface 20 of the front disk is substantially the same.

A fastening element, in this case a screw bolt 21, extends through the bearing device 5 and fixes the belt tensioner 1 to a component 27 of an internal combustion engine. The head of the screw bolt 21 rests on the front disk 9.

The operating principle of the example according to the invention shown in the FIGURE will be explained hereinafter.

By screwing the screw bolt 21 to the engine component 27, the belt tensioner 1 is fastened in a torsion-proof and axially fixed manner to the engine, and the arrangement of the bearing sleeve 3 is axially secured on the bearing device 5. At the same time, the front disk 9 is tensioned in relation to the upper axial face 19 of the bearing sleeve 3 by means of the springs 22. In this way, the damping disk 13 is prestressed.

If the tensioning arm 2 of the belt tensioner 1 is now deflected, for example by a load change of the belt, the bearing sleeve 3 rotates about the bearing device 5. To this end, it is supported radially by the bearing bushing 12 and axially by the sliding disk 11 and the damping disk 13.

The bearing bushing 12 and the damping disk 13 are paired with surfaces that have a relatively low surface roughness, and thereby enable smooth sliding and therefore pivoting of the bearing sleeve 3 about the bearing device 5. The sliding disk 13 is paired with the burnished surface 23 of the supporting disk 8. This type of surface pairing makes it possible that a minimized amount of friction, and therefore rotational force, is transmitted from the rotating bearing sleeve 3 to the supporting disk 8. The bottom 24 of the supporting disk 8, which serves as an abutment surface for the disk springs 22, is also burnished. In the event that the supporting disk 8 should still be subject to a small force and be displaced thereby, the burnished surface slides on the springs and due to the low friction coefficient prevents the disk springs 22 from rotating or being displaced at the same time.

The pivoting of the tensioning arm 2, and therefore of the bearing sleeve 3, about the bearing device 5 at the same time brings about a damping effect of the tensioning arm motion. The damping disk 13 is prestressed by the disk springs 22 and the screw bolt 21. Since the upper axial face 19 of the bearing sleeve 3 has a higher surface roughness than the surface 20 of the front disk 9 facing the bearing sleeve 3, the damping disk 13 is entrained by the bearing sleeve 3 due to friction. This means that the disk rotates along with the bearing sleeve 3 about the bearing device 5. This produces a relative displacement of the damping disk 13 in relation to the surface 20 of the front disk 9 facing the bearing sleeve 3. The surface roughness of this surface 20 is adjusted such that defined friction damping is achieved in conjunction with the pre-stress.

The invention claimed is:

1. A belt tensioner (1) for a belt drive of an internal combustion engine, comprising a central bearing device (5), by which a pivot axis (4) for the belt tensioning arm (2) is defined, and comprising a bearing sleeve (3) connected to the tensioning arm (2), the bearing device (5) extending through the bearing sleeve (3) and the bearing sleeve (3) being pivotable about the bearing device (5) in a friction-damping manner by means of a sliding element arrangement (10) including a damping member positionable on the bearing device to provide a selected amount of damping to the movement of the tensioning arm, wherein the damping member has a first damping surface and a second damping surface, and is mountable in a first orientation wherein the first damping surface faces towards a first axial direction and the second surface faces towards a second axial direction that is opposite the first axial direction, and is mountable in a second orientation wherein the second damping surface faces towards the first axial direction and the first damping surface faces towards the second axial direction, and wherein the first and second damping surfaces are made of the same material and have the same surface treatment resulting in the first and second damping surfaces having substantially the same surface roughness, providing the same sliding properties.

2. The belt tensioner according to claim 1, characterized in that the front and rear surfaces comprise polyamide 4.6.

3. A belt tensioner according to claim 1, characterized in that the front and rear surfaces are made of polyamide 4.6 and PTFE admixed with each other.

4. A belt tensioner according to claim 1, characterized in that the damping member is injection-molded.

5. A belt tensioner according to claim 1, characterized in that the bearing device (5) is made of the same material as the bearing sleeve (3).

6. A belt tensioner according to claim 1, characterized in that the sliding element arrangement (10) comprises a sliding disk (11), which is disposed between a supporting disk (8) of the bearing device (5) and a lower axial face (18) of the bearing sleeve, wherein the sliding disk (11) can be rotated both in relation to the supporting disk (8) and in relation to the bearing sleeve (3).

7. The belt tensioner according to claim 6, characterized in that the supporting disk (8) comprises a surface (23) and an undersurface (24) that have the same surface properties.

8. A belt tensioner according to claim 6, characterized in that the supporting disk (8) comprises a burnished surface (23) and undersurface (24).

9. A belt tensioner according to claim 6, characterized in that the supporting disk comprises a surface and undersurface having a lower surface roughness of Rz less than 8 μm.

10. A belt tensioner according to claim 1, characterized in that the sliding element arrangement (10) comprises a bearing bushing (12), which is disposed between a bolt (6) of the bearing device (5) and the bearing sleeve (3), wherein the bearing bushing (12) can be rotated both in relation to the bearing sleeve (3) and in relation to the bolt (6).

11. The belt tensioner according to claim 10, characterized in that an outer circumferential area (25) of the bolt (6) has a low surface roughness of Rz less than 8 μm.

12. A belt tensioner according to claim 11, characterized in that an inside (26) of the bearing sleeve (3) has a lower surface roughness of Rz less than 8 μm.

13. A belt tensioner according to claim 1, characterized in that the sliding element arrangement (10) comprises a damping disk (13), which is disposed between a front disk (9) of the bearing device (5) and an upper axial face (19) of the bearing sleeve (3), wherein the damping disk (13) is rotation-symmetrical with respect to the center thereof.

14. The belt tensioner according to claim 13, characterized in that the upper axial face (19) of the bearing sleeve (3) has a higher surface roughness than the surface (20) of the front disk (9) facing the bearing sleeve (3).

15. A belt tensioner according to claim 14, characterized in that the surface (20) of the front disk (9) facing the bearing sleeve (3) has a surface roughness in the range of Rz of approximately 10 to 25 μm.

16. A belt tensioner according to claim 14, characterized in that the upper axial face (19) of the bearing sleeve (3) has a surface roughness in the range of Rz>10 μm, at least in some regions.

17. A belt tensioner according to claim 13, characterized in that the upper axial face (19) of the bearing sleeve (3) is sandblasted, at least in some regions.

18. A belt tensioner according to claim 1, characterized in that the material of the bearing device (5) has substantially the same thermal expansion coefficient as the material of the bearing sleeve (3).

* * * * *